(12) United States Patent
Ramaswamy

(10) Patent No.: US 7,647,604 B2
(45) Date of Patent: Jan. 12, 2010

(54) METHODS AND APPARATUS FOR MEDIA SOURCE IDENTIFICATION AND TIME SHIFTED MEDIA CONSUMPTION MEASUREMENTS

(75) Inventor: Arun Ramaswamy, Tampa, FL (US)

(73) Assignee: The Nielsen Company (US), LLC., Schaumburg, IL (US)

(*) Notice: Subject to any disclaimer, the term of this patent is extended or adjusted under 35 U.S.C. 154(b) by 87 days.

(21) Appl. No.: 11/752,106

(22) Filed: May 22, 2007

(65) Prior Publication Data

US 2007/0271300 A1    Nov. 22, 2007

Related U.S. Application Data

(63) Continuation of application No. PCT/US2005/042561, filed on Nov. 22, 2005.

(60) Provisional application No. 60/629,996, filed on Nov. 22, 2004.

(51) Int. Cl.
*H04H 60/32* (2008.01)
(52) U.S. Cl. .............................. 725/9; 725/14; 725/80; 725/85; 725/133; 725/141
(58) Field of Classification Search .................... 725/9, 725/14, 16, 19, 20, 21, 80, 85, 87, 133, 141, 725/153; 386/1, 45, 46, 125, 126
See application file for complete search history.

(56) References Cited

U.S. PATENT DOCUMENTS

| | | | |
|---|---|---|---|
| 4,697,209 A * | 9/1987 | Kiewit et al. ................. 725/19 |
| 4,912,552 A * | 3/1990 | Allison et al. ................ 725/21 |
| 5,019,899 A | 5/1991 | Boles et al. | |
| 5,425,100 A * | 6/1995 | Thomas et al. ............... 725/20 |
| 5,481,294 A | 1/1996 | Thomas et al. | |
| 5,488,409 A | 1/1996 | Yuen et al. | |
| 5,512,933 A | 4/1996 | Wheatley et al. | |
| 5,621,454 A | 4/1997 | Ellis et al. | |
| 6,160,989 A * | 12/2000 | Hendricks et al. .......... 725/36 |

(Continued)

FOREIGN PATENT DOCUMENTS

WO    WO 02/097790    12/2002

(Continued)

OTHER PUBLICATIONS

Notification Concerning Transmittal of International Preliminary Report on Patentability (Chapter I of the Patent Cooperation Treaty), mailed on May 31, 2007, in corresponding PCT Application No. PCT/US2005/042561, 5 pages.

(Continued)

*Primary Examiner*—Brian P Yenke
(74) *Attorney, Agent, or Firm*—Hanley, Flight & Zimmerman, LLC

(57) ABSTRACT

Methods and apparatus for media source identification and time shifted media consumption measurements are disclosed. A disclosed method identifies a media source by generating first signature information based on media presented via a media delivery device and comparing the first signature information to second signature information. The second signature information is derived from a library of signature information local to the media delivery device. The disclosed method generates a collection of matching signature information based on the comparison of the first and second signature information, and identifies a source of the media presented via the media delivery device based on the collection of matching signature information.

30 Claims, 10 Drawing Sheets

U.S. PATENT DOCUMENTS

| | | | |
|---|---|---|---|
| 6,202,210 B1 * | 3/2001 | Ludtke | 725/20 |
| 6,404,977 B1 | 6/2002 | Iggulden | |
| 6,469,749 B1 | 10/2002 | Dimitrova et al. | |
| 6,507,951 B1 * | 1/2003 | Wugofski | 725/59 |
| 6,513,161 B2 | 1/2003 | Wheeler et al. | |
| 6,577,346 B1 | 6/2003 | Perlman | |
| 6,597,405 B1 | 7/2003 | Iggulden | |
| 6,675,383 B1 * | 1/2004 | Wheeler et al. | 725/19 |
| 6,684,194 B1 * | 1/2004 | Eldering et al. | 705/10 |
| 6,771,885 B1 * | 8/2004 | Agnihotri et al. | 386/83 |
| 6,954,718 B2 * | 10/2005 | Akers et al. | 702/188 |
| 7,065,544 B2 * | 6/2006 | Moreno | 708/422 |
| 7,302,419 B2 * | 11/2007 | Conkwright et al. | 707/1 |
| 7,379,655 B1 * | 5/2008 | Koyabu et al. | 386/52 |
| 7,421,723 B2 * | 9/2008 | Harkness et al. | 725/14 |
| 7,424,534 B2 * | 9/2008 | Karaoguz et al. | 709/226 |
| 2002/0010919 A1 | 1/2002 | Lu et al. | |
| 2002/0026635 A1 * | 2/2002 | Wheeler et al. | 725/19 |
| 2003/0005430 A1 | 1/2003 | Kolessar | |
| 2005/0144632 A1 * | 6/2005 | Mears et al. | 725/15 |
| 2005/0267750 A1 * | 12/2005 | Steuer et al. | 704/231 |
| 2006/0195857 A1 * | 8/2006 | Wheeler et al. | 725/15 |
| 2006/0242325 A1 * | 10/2006 | Ramaswamy et al. | 709/246 |
| 2007/0006275 A1 * | 1/2007 | Wright et al. | 725/133 |
| 2007/0050832 A1 * | 3/2007 | Wright et al. | 725/115 |
| 2007/0136782 A1 * | 6/2007 | Ramaswamy et al. | 725/138 |
| 2007/0186228 A1 * | 8/2007 | Ramaswamy et al. | 725/14 |
| 2007/0192782 A1 * | 8/2007 | Ramaswamy | 725/9 |
| 2008/0056675 A1 * | 3/2008 | Wright et al. | 386/95 |
| 2008/0126420 A1 * | 5/2008 | Wright et al. | 707/104.1 |

OTHER PUBLICATIONS

International Search Report and Written Opinion mailed in corresponding PCT Application Serial No. PCT/US2005/042561, dated Mar. 27, 2007, 7 pages.

* cited by examiner

700

702 — | SOURCEID | TIME STAMP | — 704
---|---|---
| ID1 | TS1 |
| ID2 | TS2 |
| ID3 | TS3 |

```
902:    Struct {
904:        bool         TimeShift;
906:        if(TimeShift) {
908:            SourceID    TimeShiftSource;
910:            Time        TimeShiftSourceTime;
912:        }
914:        SourceID     TuningSource;
916:        Time         TuningTime;
918:    }
```

FIG. 9

METHODS AND APPARATUS FOR MEDIA SOURCE IDENTIFICATION AND TIME SHIFTED MEDIA CONSUMPTION MEASUREMENTS

RELATED APPLICATION

This patent arises from a continuation of International Patent Application No. PCT/US2005/042561, entitled "Methods and Apparatus for Media Source Identification and Time Media Consumption Measurements", which was filed on Nov. 22, 2005, which claims the benefit of the filing date of U.S. Provisional Patent Application No. 60/629,996, entitled "Methods and Apparatus for Media Source Identification and Time Media Consumption Measurements" and filed on Nov. 22, 2004, the entire disclosures of which are incorporated by reference herein in their entirety.

TECHNICAL FIELD

The present disclosure is directed generally to media source identification and, more particularly, to methods and apparatus for media source identification and time shifted media consumption measurements.

BACKGROUND

The metering of audio/video content (e.g., television programs, radio programs, etc.) is typically performed by collecting consumption records (e.g., viewing records) or other consumption information from a group of statistically selected households. Each of the statistically selected households typically has a data logging and processing unit commonly referred to as a home unit or site unit. The site unit may communicate with a variety of attachments that provide inputs to the site unit or that receive outputs from the site unit. For example, in the case where consumption consists of viewing conventional analog television broadcasts, a source identification unit such as a frequency detector attachment, which is a well-known device, may be in communication with a television to sense a local oscillator frequency of the television tuner. In this manner, the frequency detector attachment may be used to determine if the television is operating (i.e., is turned on) and to determine the broadcast channel to which the television is currently tuned based on a detected frequency. Additionally, a people counter, which is also a well-known device, may be located in the viewing space of the television and in communication with the site unit, thereby enabling the site unit to detect the number of persons currently viewing programs displayed on the television.

The site unit usually processes inputs (e.g., channel tuning information, number of viewers, etc.) from the attachments to produce consumption records. Consumption records may be generated on a periodic basis (i.e., at fixed time intervals) or may be generated in response to a change in an input such as, for example, a change in the number of the persons viewing the television, a change in the audio/video tuning information (i.e., a channel change), etc. In the case where the content consumed is associated with a broadcast television program, the consumption records may contain information such as a broadcast station or a channel number and a time (e.g., date and time of day) at which the audio/video content associated with the program was consumed. In the case where the audio/video content consumed is associated with a local audio/video content delivery system or device such as, for example, a personal video recorder (PVR), a digital versatile disk (DVD) player, a digital video recorder (DVR), a video cassette recorder (VCR), a set-top box (STB), game consoles, and/or any other device capable of reproducing audio and/or video information, the consumption records may include content identification (i.e., program identification) information as well as information relating to the time and manner in which the associated content was consumed. Of course, consumption records may contain other or additional information such as the number of viewers present at the consumption (e.g., viewing) time.

The site unit collects a quantity of consumption records and transmits collected consumption records, usually daily, to a central office or central data processing facility for further processing or analysis. The central data processing facility receives consumption records from site units located in some or all of the statistically selected households and analyzes the consumption records to ascertain the consumption behaviors of a particular household or a particular group of households selected from all participating households. Additionally, the central data processing facility may generate audio/video content consumption behavior statistics and other parameters indicative of consumption behavior associated with some or all of the participating households.

The rapid development and deployment of a wide variety of audio/video content delivery and distribution system technology platforms has complicated the task of obtaining and providing consumption records or information to the data collection facility. For instance, while the above-mentioned frequency detector device can be used to detect channel information at a site where television broadcasts are received via a radio frequency (RF) signal (because, under normal operating conditions, the local oscillator frequency corresponds to a known network channel that broadcasts a known lineup of television programs), such a device typically cannot be used with digital broadcast systems. In particular, digital broadcast systems (e.g., satellite-based digital television systems, digital cable systems, etc.) typically include a digital receiver or set-top box at each subscriber site. The digital receiver or set-top box demodulates a multi-program data stream, parses the multi-program data stream into individual audio and/or video data packets, and selectively processes those data packets to generate an audio/video signal for a selected portion of the audio/video content (e.g., a desired program). The audio and/or video output signals generated by the set-top box can typically be directly coupled to an audio/video input of a display and a set of associated speakers (e.g., a television system, a video monitor with corresponding speakers, etc.) As a result, the local oscillator frequency of the output device tuner (e.g., television), if any, does not necessarily have any meaningful relationship to the audio/video content (e.g., a broadcast channel, an audio and/or video program, etc.) being consumed within the household.

Similarly, obtaining consumption records or information is complicated in cases in which the audio/video content being consumed is delivered to the television via a local content source such as, for example, a PVR, a DVD player, a DVR, a VCR, a STB, a game console, and/or any other device capable of reproducing audio and/or video information at a consumption site. Such local audio/video content delivery devices or media sources enable the same audio/video content to be viewed at various times. Thus, the consumption of the audio/video content may be time shifted with respect to a time at which the audio/video content is originally broadcast and/or with respect to the different times at which the audio/video content is consumed at different consumption sites. The different times and manners in which audio/video content can be consumed across consumption sites precludes the use of a program lineup or the like at a central data processing facility to identify consumed audio/video content based on channel and consumption time information and significantly complicates audio/video content identification at the central facility. As a result, at least a portion of audio/video content consumption activities are not readily measurable using known media consumption measurement techniques.

BRIEF DESCRIPTION OF THE DRAWINGS

FIG. 7 is a tabular representation of an example matcher collection.

FIG. 9 is an example time shift analysis data structure from a time shift analyzer.

DETAILED DESCRIPTION

Figure 1:
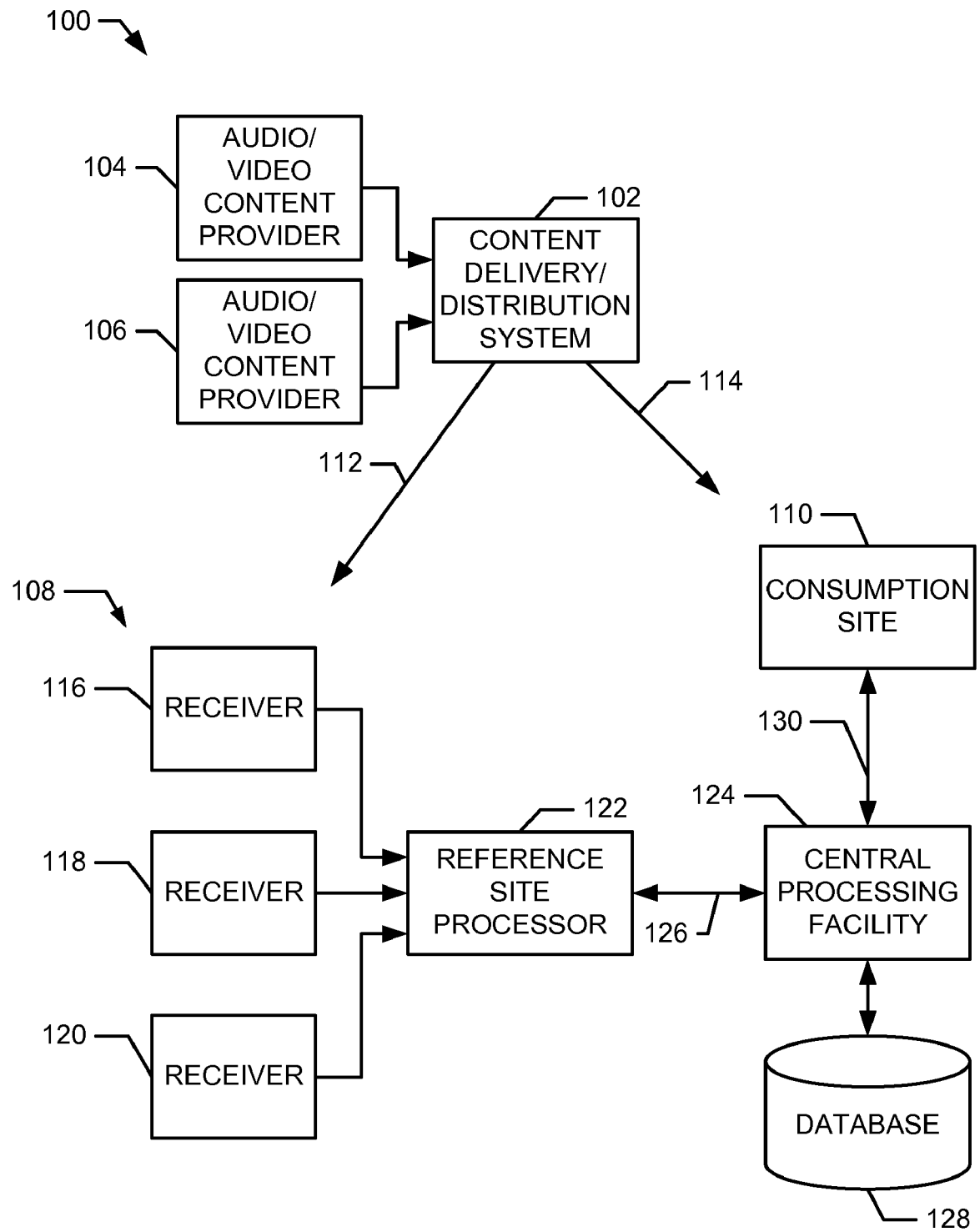
FIG. 1 is a block diagram of an example media monitoring system that may be configured to identify the source of audio/video content and measure time shifted media consumption.

The following describes example methods, apparatus, and articles of manufacture that may be used to identify sources of media content and measure time shifted consumption (e.g., viewing, listening, etc.) of media content. In general, source identification refers to determining which of a plurality of media sources (e.g., a television program, an audio program, web pages, a video game, etc.) is presenting or delivering media content. The methods, apparatus, and articles of manufacture disclosed herein are particularly well-suited to identify media sources in media delivery systems in which time shifted consumption of media content may occur. In general, time shifted media consumption occurs when an individual consumer causes one or more media sources (e.g., a PVR, a DVD player, a DVR, a VCR, an STB, a game console, and/or any other devices capable of reproducing audio and/or video information) to present or deliver media content at a time convenient to the consumer (e.g., viewing broadcast or pre-recorded content at a time that is subsequent to the time at which the content was recorded and/or broadcast). Such local media content sources (e.g., PVRs, DVRs, etc.) enable a given media content (e.g., a television program) to be viewed at different times across consumption sites, regardless of whether the media content was recorded at a particular time or broadcast to the consumption sites at the same time. The example methods and apparatus described herein use signature information (e.g., a signature, a source identifier, a time stamp, etc.) to identify media sources and to measure time shifted media consumption activities.

An example method identifies a local media source (i.e., a PVR, a DVD player, a DVR, a VCR, an STB, a game console, and/or any other device capable of reproducing and/or presenting audio and/or video information) by generating signature information based on media (e.g., a television program, a radio program, etc.) presented via a media delivery device (e.g., a television set, a radio, etc.), and comparing the signature information to additional signature information derived from a library of signature information local to the media delivery device. A collection (e.g., a hash table data structure, a queue data structure, a linked list data structure, etc.) of matching signature information may be generated based on the comparison of the signature information. The media source (i.e., a PVR, a DVD player, a DVR, a VCR, an STB, a game console, etc.) of the media presented via the media delivery device may be identified based on the collection of matching signature information.

While the following describes example systems implemented using software or firmware (e.g., machine accessible or readable instructions) executed by hardware (e.g., a processor-based system), those having ordinary skill in the art will readily recognize that the disclosed example systems could be implemented exclusively in hardware through the use of one or more custom circuits, such as, for example, application-specific integrated circuits (ASICs) or any other suitable combination of hardware and/or software.

FIG. 1 is a block diagram of an example system 100 within which the example media source identification and time shifted media consumption (e.g., viewing) measurement apparatus and methods described herein may be implemented. The example system 100 shown in FIG. 1 includes a content delivery/distribution system 102 that receives video and/or audio content from a plurality of audio/video content providers 104 and 106. The content delivery/distribution system 102 may be any form of audio and/or video content delivery/distribution system. For example, the content delivery/distribution system 102 may include a radio broadcast station, a television broadcast station, a point-to-point network, a multipoint network, etc. The audio/video content providers 104 and 106 may provide television programs, advertisements, audio (e.g., radio) programs, still image information (e.g., web pages), etc. in known manners to the content delivery/distribution system 102. The content delivery/distribution system 102 may transmit one or more signals containing digital and/or analog audio/video content information to a reference site 108 and at least one consumption site 110 via respective communication paths or links 112 and 114.

The communication paths or links 112 and 114 may include any combination of hardwired or wireless links such as, for example, satellite links, wireless land-based links, cable links, the Internet, etc. The signals conveyed via the links 112 and 114 may contain multi-program analog signals and/or digital data streams commonly employed with existing broadcast systems as well as other types of audio/video content delivery/distribution systems.

As shown in FIG. 1, the reference site 108 may include a plurality of receivers (e.g., set-top boxes or the like) 116, 118, and 120 that simultaneously demodulate, demultiplex and/or decode audio, video and/or other information received via the communication link 112 from the content delivery/distribution system 102. In one example, each of the receivers 116, 118, and 120 provides audio information (e.g., ancillary codes, renderable audio signals, etc.) associated with a different portion of the audio/video content (e.g., different programs) that is currently being transmitted (e.g., broadcast) to a reference site processor 122. For example, the receiver 116 may provide audio information associated with a first program to the reference site processor 122 while the receivers 118 and 120 provide audio information associated with respective second and third programs to the reference site processor 122. In any case, the reference site processor 122 is configured to control and/or has information indicating the portion of the audio/video content (e.g., which channel, program, etc.) to which each of the receivers 116, 118, and 120 is tuned.

In general, the reference site processor 122 performs well-known methods for generating reference signature information for each of a plurality of broadcast programs. In a commonly used process for identifying media content using signatures generated at a reference site, the reference signature information associated with media content broadcast on a specific channel at a specific time may include, for example, a signature that uniquely represents that media content, information identifying the channel on which that media content was received at the reference site and information indicating the time at which that media content was received at the reference site. The reference site processor 122 sends the generated reference signature information to a central processing facility 124 via a communication link 126. In turn, the central processing facility 124 may store the reference signature information in a database 128. Subsequently, a signature associated with media content displayed on a television at a media consumption site 110 is generated at the media consumption site 110 and transmitted to the central processing facility 124 for comparison to the reference signature information stored in the database 128. When a match is detected, the matching reference signature information is used to identify the channel on which the associated media content was received at the reference site 108 and to identify the time at which the associated media content was received at the reference site 108. This information may then be compared to known broadcast lineup information associated with the identified channel and time to identify the television programming contained in the associated media content. As will be described in greater detail hereinafter, the example methods and apparatus for identifying time-shifted media consumption described herein can be implemented in connection with a conventional media consumption measurement system used to measure non time-shifted media consumption activities to provide a system capable of measuring both time shifted and non-time shifted media consumption (e.g., broadcast television viewing).

In one example, the database 128 may be implemented as a plurality of media monitoring site (MMS) databases, each of which is configured to store signature information associated with media content delivered via a different type of medium (e.g., a database for broadcast programs, a database for DVD movies, a database for video games, etc.) Each of the MMS databases may include all or substantially all of the media type associated with that particular database. For example, the DVD movies database may contain all or substantially all available DVD movies.

The consumption site 110 could be, for example, a statistically selected home, business, etc. containing a television, a radio, a computer, etc. that sends consumption records generated by the consumption site 110 to the central processing facility 124 via a communication link 130. An example process for implementing the functionality of the consumption site 110 is described in detail below in conjunction with FIG. 3.

While the example consumption site 110 is depicted in FIG. 1 as receiving media content from a remotely situated content delivery/distribution system 102 (e.g., a broadcast station) via the communication link 114, the consumption site 110 may alternatively or additionally receive media content from one or more local media content delivery systems or devices. As discussed in greater detail below in conjunction with FIG. 2, the local media sources may include one or more PVRs, DVD players, DVRs, VCRs, STBs, game consoles, and/or any other devices capable of locally reproducing audio and/or video information. In addition, while the example system 100 shown in FIG. 1 depicts a single consumption site (i.e., the consumption site 110), multiple consumption sites may receive media content via the link 114 and may be communicatively coupled to the central processing facility 124.

Figure 2:
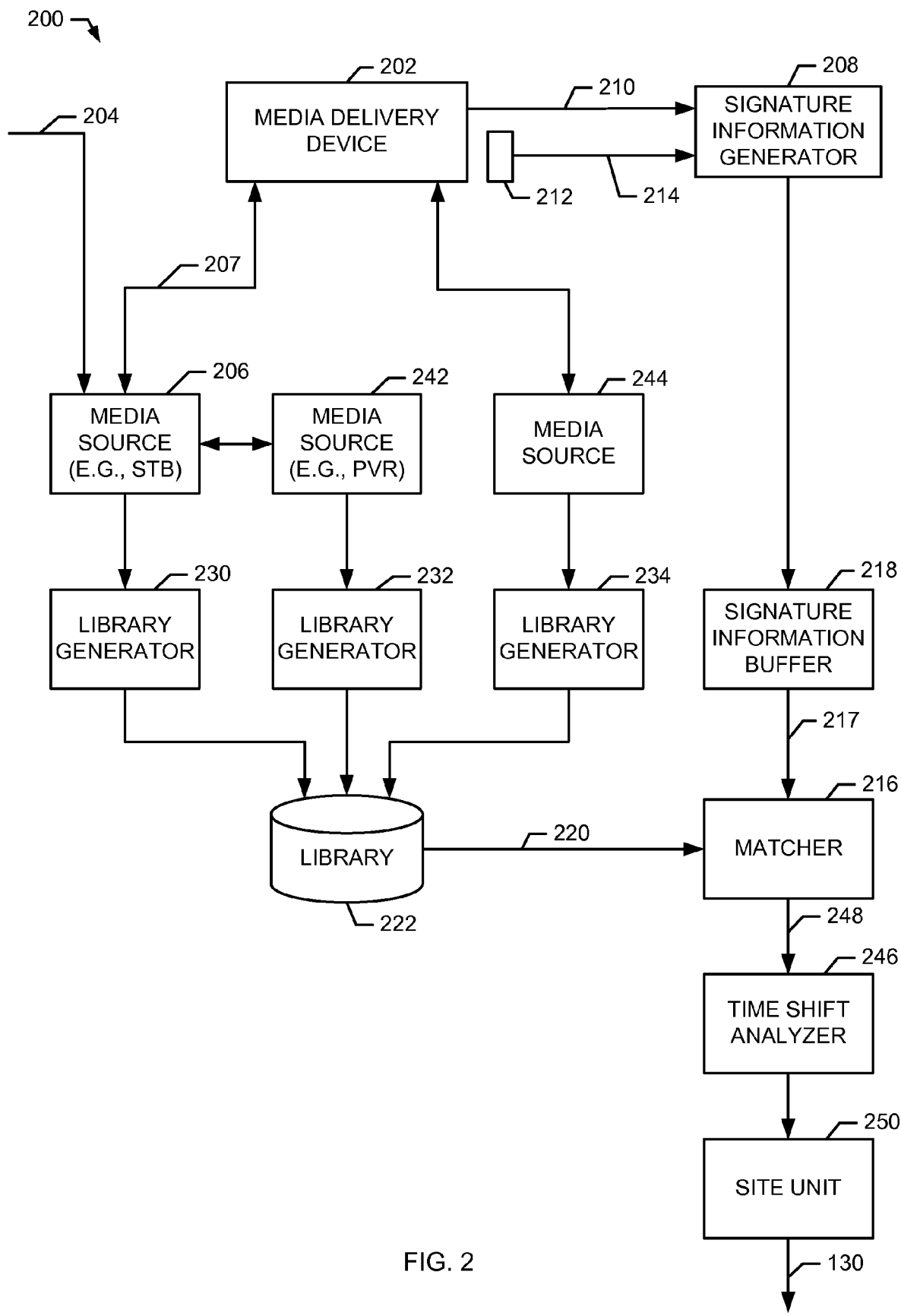
FIG. 2 is a block diagram of an example implementation of the consumption site shown in FIG. 1.

FIG. 2 is a block diagram of an example system 200 that may be used to implement the consumption site 110 of FIG. 1. As shown in FIG. 2, the example system 200 includes a media delivery device 202 such as, for example, a television, radio, video monitor, etc. that receives (as described in detail below) a media content signal 204 (e.g., an audio/video signal), which may be derived directly or indirectly via the communication link 114 (FIG. 1). For example, the media content signal 204 may be provided by a low noise block coupled to a satellite receiving dish in the case where the link 114 (FIG. 1) is a satellite communication link.

A media source 206 may be a receiver, a decoder, or a set-top box 206 that is serially imposed between the media content signal 204 received via the link 114 (FIG. 1) and the media delivery device 202. For example, in the case where the media content signal 204 received via the link 114 is a digital satellite or cable television transmission, the media source 206 is a set-top box that demodulates the broadcast signal, demodulates multi-program data streams, and selectively parses video and/or audio data packets associated with a desired channel and/or program from one or more of the data streams. The selected data packets are processed to form an output signal 207 that can be processed and output or rendered (e.g., played or displayed) by the media delivery device 202. For example, in the case where the media delivery device 202 is a television, the output signal 207 may be a composite video signal, an s-video signal, a red, green, blue (RGB) signal, or any other displayable video signal applied to the appropriate input(s) of the media delivery device 202 accompanied by an audio signal to be emitted by a set of speakers associated with the media delivery device 202. In the case where the media content signal 204 received via the link 114 is a conventional analog television transmission or signal, the set-top box 206 may not be required and the media content signal 204 may be directly coupled to the media delivery device 202 (e.g., directly coupled to UHF/VHF inputs). In addition to the signal processing functions of the set-top box 206, the set-top box 206 may also perform access control functions such as, for example, determining the media content that is available for consumption (e.g., viewing and/or listening) by a user of the example system 200 based on subscription status or subscription information associated with the example system 200, generating displayable program guide information, etc.

The example system 200 also includes a signature information generator 208 that performs signature generation functions using one or more media signals provided by the media delivery device 202. More specifically, in one example, the signature information generator 208 receives an audio output signal 210 from the media delivery device 202. The audio output signal 210 contains audio information associated with the media content currently being presented by the media delivery device 202. For example, in the case where the media content signal 204 received via the link 114 (FIG. 1) is delivered via a broadcast signal, the audio information provided by the audio output signal 210 may be associated with a television channel or program to which the example system 200 is currently tuned. Alternatively, the signature information generator 208 may be coupled to an acoustic transducer 212 such as, for example, a microphone that is proximate to an acoustic output device (e.g., a speaker) associated with the media delivery device 202. In that case, the acoustic transducer 212 supplies an audio output signal 214 containing information associated with the media content currently being presented or otherwise rendered by the media delivery device 202 instead of, or in addition to, the audio output signal 210.

The signature information generator 208 may employ one or more well-known signature-based media (e.g., audio, video, etc.) content identification techniques, which use one or more characteristics of the media content (that is not yet identified) to generate a signature (e.g., a series of digital values, a waveform, etc.) that substantially, uniquely represents that media content. In general, audio signature-based media content identification techniques are computationally efficient and require less memory than known video signature-based techniques. However, either audio or video signature-based techniques may be employed, and because many such techniques are known in the art, further discussion of these techniques is not provided herein.

The signature information generated by the well-known signature generation technique(s) may be transmitted to a matcher 216 via a communication link 217 to match the signature information to media content received from one or more media sources. Additionally, in one example implementation, a signature information buffer 218 may be interposed between the signature information generator 208 and the matcher 216. The signature information buffer 218 may be used to store signature information in memory (e.g. the main memory device 1008 of FIG. 10). The signature information buffer 218 may utilize an array, a queue, a stack, a linked list, or any other suitable data structure and may periodically convey signature information to the matcher 216. For example, the signature information generator 208 may be configured to generate and store signature information corresponding to thirty minutes of audio content in the signature information buffer 218 before transferring the signature information to the matcher 216.

As described in greater detail below, the signature information generator 208 generates signature information corresponding to media content presented by the media delivery device 202. In one example, the signature information generator 208 sequentially generates reference signatures for each program, channel or, more generally, any and all media content extracted or otherwise derived from the media content signal 204 and presented via the media delivery device 202. The matcher 216 compares the signature information associated with the media content presented via the media delivery device 202 to signature information 220 stored in a local reference library 222. If the comparison (e.g., within the matcher 216) of the signature information 217 generated by the signature information generator 208 to some or all of the signature information 220 from the local reference library 222 yields a substantial or identical match, the matcher 216 outputs a collection (i.e., a matcher collection) of data that associates some or all of the signature information 220 from the local reference library 222 with the signature information 217 received from the signature information generator 208. An example process for matching signature information that may be implemented by the matcher 216 is described in greater detail below in conjunction with FIG. 6.

The local reference library 222 may include XML files, database files (e.g., a Microsoft® Access® database, an IBM® DB2® database, database products from companies such as Oracle®, Sybase®, Computer Associates®, etc.), files associated with hash tables, structures in memory, and/or any other suitable data storage mechanism or structure. The local reference library 222 is generated and updated by a plurality of library generators 230, 232, and 234, each of which receives media (e.g., audio, video, etc.) content from respective media sources 206, 242, and 244. An example process for updating a library, which may be implemented by the library generators 230, 232, and 234, is described in greater detail below in conjunction with FIG. 5. The media sources 206, 242, and 244 may be local to (e.g., within) a monitored household and may include one or more PVRs, DVD players, DVRs, VCRs, game consoles, STBs, etc. As depicted in FIG. 2, the media sources 206, 242, and 244 are operatively coupled to the media delivery device 202 for record and playback functionality. In addition, although three media sources (i.e., the media sources 206, 242, and 244) are shown in FIG. 2, more or fewer media sources could be used instead.

The media source 206, which may be a set-top box, is serially imposed between the media delivery device 202 and the media source 242, which may be implemented, for example, as a PVR. When the PVR 242 is in playback mode, the PVR 242 may send media signals though an audio/video output, a radio frequency (RF) output, etc. to the set-top box 206 and, thus, to the media delivery device 202.

In the example in which the media source 242 is a PVR and the media source 206 is a set-top box, the signature information derived from the PVR 242 in playback mode can be monitored for time shifted information. For example, when the PVR 242 receives and records media content from the set-top box 206 for later retrieval/viewing by the user/viewer, the library generator 230 generates corresponding signature information of the media content. Such signature information may include, for example, a set of records, each including a time stamp, a signature, and a source ID representing the set-top box 206. The library generator 230 may then insert or otherwise store the signature information in the local reference library 222.

When the media content from the PVR 242 is subsequently played back, the library generator 232 may process the media content to generate signature information. Again, the signature information may include records, each including, for example, a time stamp, a signature that may be substantially similar to the signature generated during the recording of the media content, and a source ID representing the PVR 242. The library generator 232 may then insert or otherwise store the signature information in the local reference library 222.

When the media content from the PVR 242 is played back, the media content is also rendered on the media delivery device 202 and the signature information generator 208 processes the media content presented via the media delivery device 202 to generate or collect signature information. As a result, signature information including records containing time stamps and corresponding signatures that are substantially the same as those generated by the library generators 230 and 232 may be stored in the signature information buffer 218. However, unlike the signature information generated by the library generator 230 and the signature information generated by the library generator 232, which include source ID information representing the set top box 206 and the PVR 242, respectively, the signature information stored in the buffer 218 includes source ID information that represents the media delivery device 202. As described in greater detail below in connection with FIG. 6, the matcher 216 compares the time stamps of the signature information stored in the signature information buffer 218 with the time stamps of the signature information in the local reference library 222 and, if the time stamps are the same or are substantially similar, the matcher 216 compares the signature information associated with the matching time stamps in much the same manner as is discussed above in connection with the matcher 216.

In another example, the media source 244, which may be a game console, may supply media content that has never before been generated or presented at the consumption site 110 of FIG. 1. In this case, the library generator 234 generates signature information using the information supplied by the media source 244 and then inserts the generated signature information into the local reference library 222. Because the local reference library 222 is used to store signature information generated using media content supplied by the game console media source 244 exclusively, when signature information stored in the local reference library 222 is compared to signature information stored in the signature information buffer 218, a match indicates that the game console media source 244 is the source of the signature information and, thus, is the source of the associated media content. Any of a variety of well-known techniques may be used to identify the source of the signature information. For example, a uniform source ID value, which has been derived from the local source ID and which may be standardized among consumption sites (e.g., the consumption site 110 of FIG. 1), may be inserted into the signature information. To identify the content (e.g., the type and/or name of a game being played) in this case, the signature information may be transferred to the central processing facility 124 of FIG. 1 and compared to signature information stored within a plurality of MMS databases, as discussed above in conjunction with FIG. 1. For example, the MMS databases may include one or more signatures generated from a plurality of fixed preamble sounds (e.g., a jingle, theme music, and/or any suitable sounds that are deterministic, distinguishable, or uniquely identifiable in nature) associated with a plurality of reference games, which are then matched against one or more signatures from the local reference library 222. In addition, the source identifier may be used by the central processing facility 124 to determine which of the MMS databases is most likely to contain a match (e.g., game console signature information may be matched with a game console database because the source identifier classifies the source of the game console signature as a game console).

As depicted in FIG. 2, the matcher 216 is coupled to a time shift analyzer 246 via a communication link or connection 248. The matcher 216 periodically or continuously sends matcher collections associated with media content presented via the media delivery device 202 to the time shift analyzer 246. The time shift analyzer 246 receives the matcher collection and converts the matcher collection to a time shift analysis data structure. For example, if the matcher collection includes time shifted information, the time shift analysis data structure may indicate the inclusion of the time shifted information by setting a Boolean flag associated with the time shift analysis data structure. An example of such a Boolean flag is described below in conjunction with the example TimeShift variable declaration instruction depicted in FIG. 9. The matcher collections may be received and processed by the time shift analyzer 246 to form the above-mentioned time shift data analysis structure and the time shift data analysis structure may be transmitted to a site unit 250.

Figure 10:
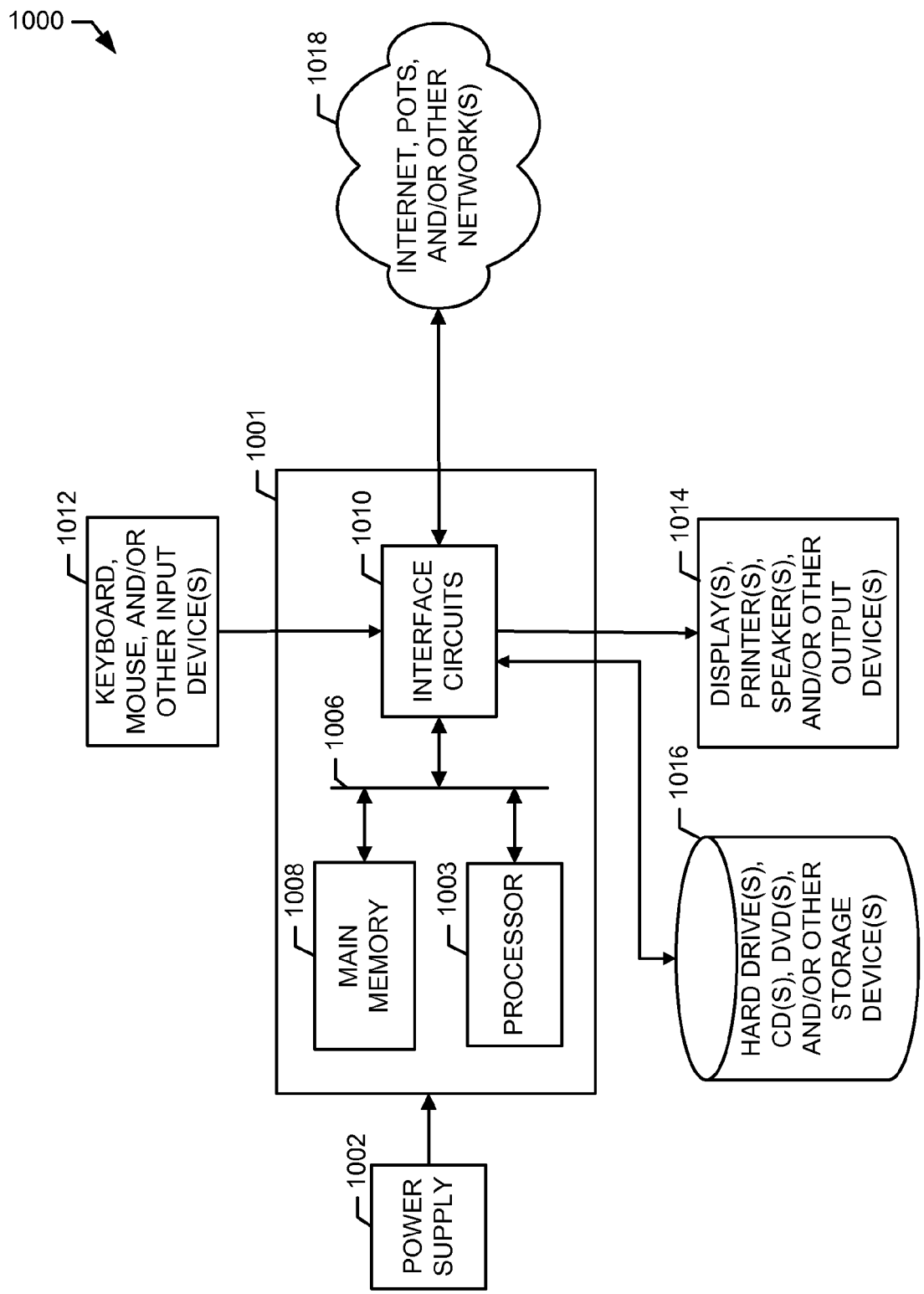
FIG. 10 is a block diagram of an example processor system that may be used to implement the example methods and apparatus disclosed herein.

The site unit 250 may store the time shift analysis data structure in a consumption record in memory (e.g., the main memory device 1008 and/or the storage devices 1016 of FIG. 10) and may send a collection of consumption records (i.e., a consumption report, viewing records, etc.) to a central processing facility such as, for example, the central processing facility 124 of FIG. 1, via the communication link 130. Additionally, the site unit 250 may store signatures associated with the time shift analysis data structure in the consumption report. Additionally or alternatively, the time shift analyzer 246 may insert signatures into the time shift analysis data structure (not shown in the example time shift analysis data structure of FIG. 9). By associating signatures with the time shift analysis data structure, the identity of media content can be readily determined at the central processing facility 124 of FIG. 1.

While the signature information generator 208, the library generators 230, 232, and 234, the matcher 216, the time shift analyzer 246, and the site unit 250 may be located at a consumption site (e.g., the consumption site 110 of FIG. 1), some or all of the functions performed by the signature information generator 208, the library generators 230, 232, and 234, the matcher 216, the time shift analyzer 246, and the site unit 250 can be combined. For instance, the signature information generation, signature information comparison function, and/or the signature information time shift detection function may be performed by the site unit 250.

Figure 3:
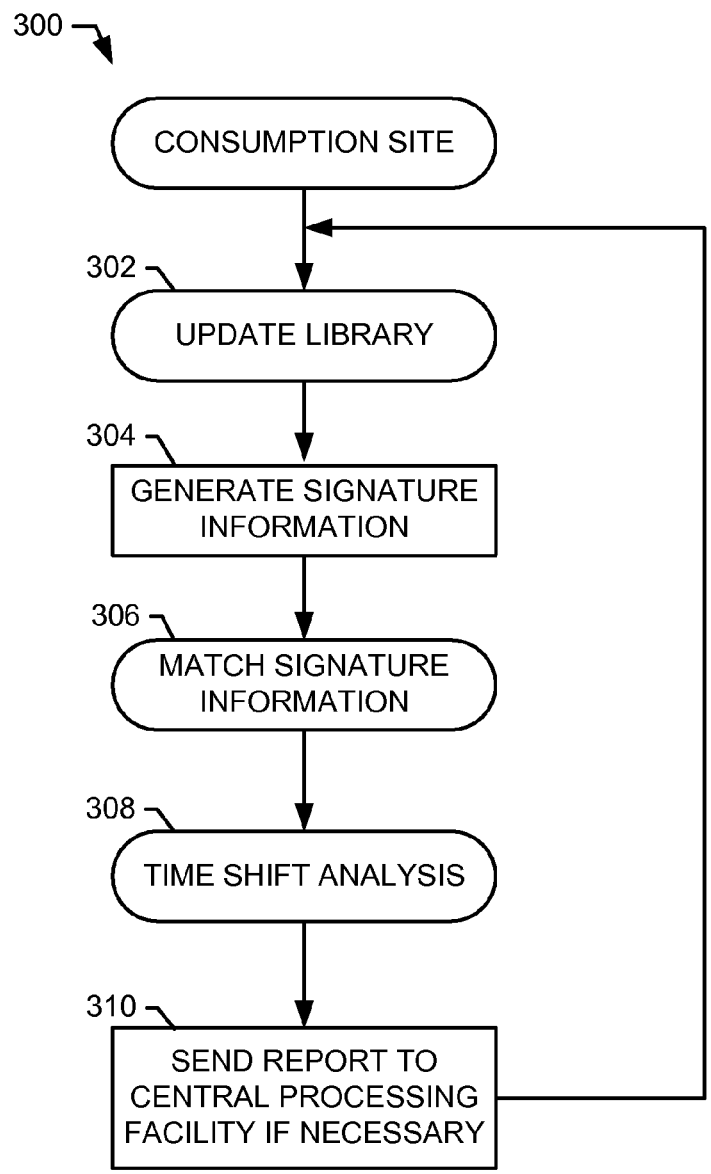
FIG. 3 is a flow diagram of an example process that may be performed by the example consumption site shown in FIG. 2.

FIG. 3 is a flow diagram of an example consumption site process 300 (i.e., a process that may, for example, be performed by the example consumption site system 200 depicted in FIG. 2). The consumption site process 300 begins execution by updating the library (e.g., the local reference library 222 of FIG. 2) by invoking an update library process (block 302). The update library process (block 302) inserts signature information (i.e., time stamps, signatures, source IDs, etc.) from one or more signature generators (e.g., the library generators 230, 232, and 234) into a library (e.g., the local reference library 222 of FIG. 2). The library may be updated periodically (e.g., once per second, once per fifteen seconds, etc.). The update library process (block 302) is described below in greater detail in conjunction with FIG. 5.

After invoking the update library process (block 302), the consumption site process 300 generates or collects signatures or signature information (block 304) associated with media content currently being consumed. As described in greater detail above in conjunction with FIG. 2, known audio signature-based techniques such as the RMS of the energy of the audio signal, the number of zero crossings between fixed time intervals, the temporal characteristics of signal wavelets, the temporal characteristics of signal spectral content, and/or any other feature or characteristic of a signal may be used to generate signature information (e.g., signature values). The signature information may be generated at block 304 by, for example, the signature information generator 208 of FIG. 2.

After generating the signatures or signature information (block 304), the consumption site process 300 matches the newly generated signature information to the signature information stored in the library (e.g., the local reference library 222) by invoking a match signature in information process (block 306). The match signature information process (block 306) compares first signature information (e.g., the signature information generated by the signature information generator 208 and stored in the signature information buffer 218) to second signature information (e.g., the signature information generated by the library generators 230, 232, and 234 and stored in the local reference library 222) and generates a matcher collection of signature information (i.e., a collection of signature information corresponding to signature information for which substantial or identical matches were found at block 306). An example match signature information process is described below in greater detail in conjunction with FIG. 6.

Figure 4:
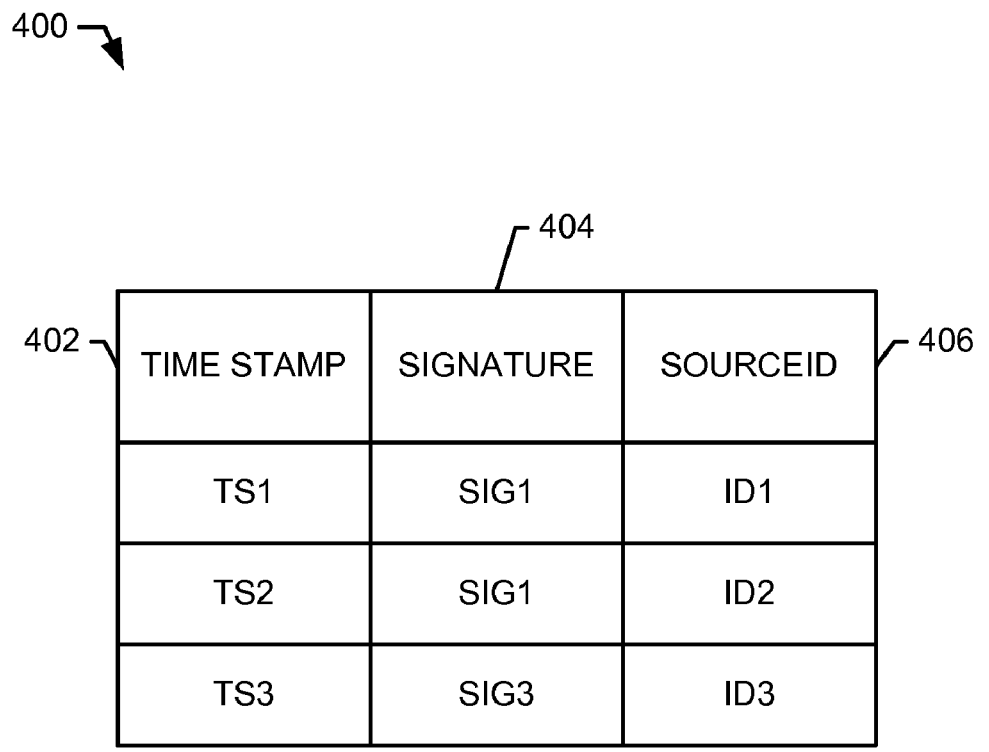
FIG. 4 is a tabular representation of an example library that may be used with the methods and apparatus described herein.

After invoking the match signature information process (block 306), the consumption site process 300 analyzes the data in the matcher collection returned by the match signature information process (block 306) for time shifted information (block 308). The time shifted information may be analyzed by the consumption site process 300 via a time shift analyzer (e.g., the example time shift analyzer 246 of FIG. 2). The time shift analyzer may determine that the matcher collection includes time shifted data by analyzing the number of records. For example, FIG. 4 shows a first record that includes a time stamp TS1, a signature SIG1, and a source identifier ID1. FIG. 4 further discloses a second record that includes a time stamp TS2, a signature SIG2, and a source identifier ID2, and a third record that includes a time stamp TS3, a signature SIG3, and a source identifier ID3. For example, if the matcher collection has two or more records with the same signature values (e.g., the first record and the second record of FIG. 4 have the same signature values [i.e., SIG1 equals SIG2]) but different time stamp values (e.g., if TS2 is greater than TS1), the time shift analyzer may be adapted to consider these two or more records as being associated with time-shifted consumption and, thus, may determine that the matcher collection includes time shifted data. Once the matcher collection has been analyzed, the time shift analyzer 246 may create a consumption record that is added to a consumption report.

After analyzing the time shifted information (block 308), the consumption site process 300 determines if the consumption report is to be sent to a central processing facility (e.g., the central processing facility 124 of FIG. 1) and sends the report if necessary and then returns control to block 302 (block 310). The consumption site process 300 may determine whether it is time to send the consumption report to the central processing facility by implementing one of many well-known techniques. For example, the consumption site process 300 may use a site unit (e.g., the site unit 250 of FIG. 2) including an internal clock to determine if a time threshold has been exceeded (e.g., twenty-four hours) since the last consumption report was sent. If the time threshold has been exceeded, the consumption site process 300 may send the consumption report to the central processing facility (e.g., the facility 124 of FIG. 1). Alternatively, the consumption report may send the information substantially continuously in a real-time manner to the central processing facility. Of course, the consumption report may be sent in response to other conditions such as, for example, a request by a human operator for a report to be sent, a determination that a certain amount of data has been collected, etc.

FIG. 4 is a tabular representation of an example library 400 (e.g., the local reference library 222 of FIG. 2). The example library 400 includes a time stamp attribute 402, a signature attribute 404, and a source ID attribute 406. The example time stamp values (e.g., TS1, TS2, and TS3) may be stored in data locations associated with the time stamp attribute 402. The example signature values (e.g., SIG1 and SIG3) may be stored in data locations associated with the signature attribute 404. The example source identifier (ID) values (e.g., ID1, ID2, and ID3) may be stored in data locations associated with the source ID attribute 406.

The semantic definitions associated with the source ID values may be defined globally or standardized (e.g., a PVR may be assigned a value of 1 for all monitored households) or the source ID may be defined locally (e.g., a value of a PVR may vary based on the configuration of a particular monitored household). If the source ID is defined locally, the source ID may be converted into a globally defined source ID, a human readable string, etc. before being transmitted to the central processing facility 124 of FIG. 1. Additionally, an external computer system or server communicatively coupled to a network (e.g., the network 1018 of FIG. 10) may be used to convert the locally defined source ID to a globally defined or standardized source ID. For example, the consumption site 110 may send a TCP/IP request having a locally defined source ID value to the server and may receive a TCP/IP response having a globally defined source ID value from the server. The example library 400 may be implemented as a hash table, a database (e.g., a Microsoft® Access® database, an IBM® DB2® database, database products from companies such as Oracle®, Sybase®, and Computer Associates®, etc.), a structure in memory, and/or any other suitable data storage mechanism or structure.

Figure 5:
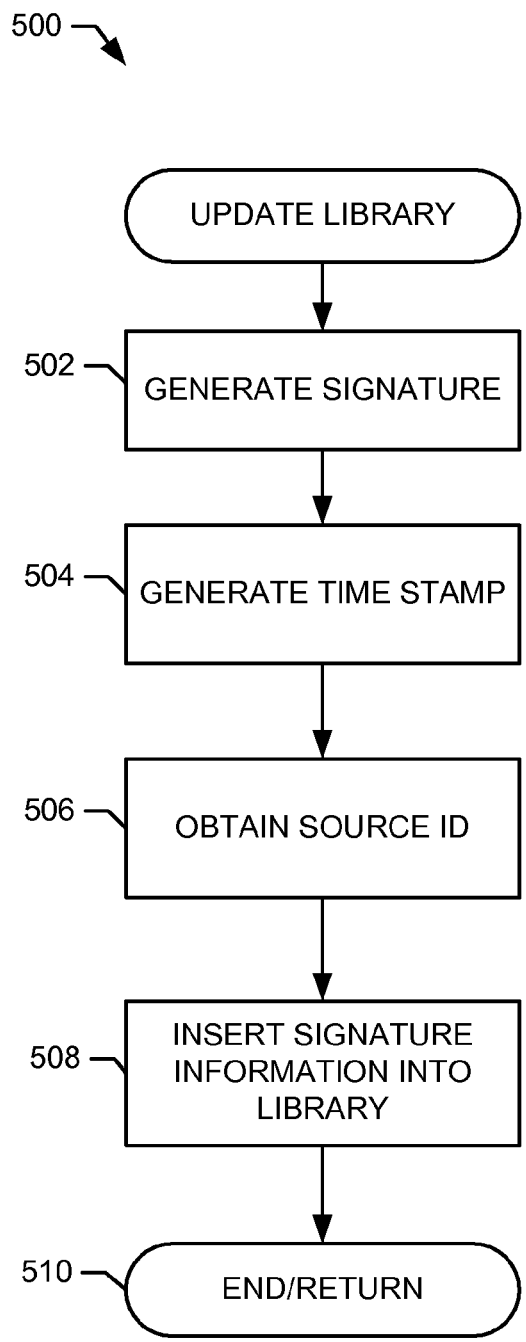
FIG. 5 is a flow diagram of an example process for updating a library.

FIG. 5 is a flow diagram of an example process for updating a signature library. The update library process 500 begins execution by generating a signature (block 502). As described above in conjunction with the signature information generator 208 (FIG. 2), techniques for generating signatures based on consumed media content are well known and, thus, are not described in greater detail herein. After generating the signature (block 502), the update library process 500 generates a time stamp (block 504). The time stamp is a well-known technique for representing a time (e.g., a current time) at which an event occurs. For example, the time stamp may be generated by a processor (e.g., the processor 1003 of FIG. 10) using a hardware timer. In particular, the time stamp may be generated by calling a function defined by an application program interface (API) specified by a programming language. For example, calling the C language function time() returns the current time as a time stamp.

After generating the time stamp (block 504), the update library process 500 obtains a source identifier (ID) (block 506). The library generators 230, 232, and 234 may be assigned hard coded source ID values or may use a source ID configuration file that can be automatically or manually configured with the source ID values. Alternatively, the example local reference library 222 may instead be implemented as a plurality of libraries that have no source ID attributes (e.g., the source ID attribute 406 of FIG. 4) associated with individual library records in the libraries. For example, the source ID may be a hard-coded value for a library having a one-to-one relationship with a source ID. In such a case, block 506 may be optional.

After obtaining the source ID (block 506), the update library process 500 inserts the signature information, generated at blocks 502, 504, and 506, into the library (block 508). For example, the update library process 500 may insert a time stamp value (e.g., one of the time stamp values TS1, TS2, and TS3 of FIG. 4) into a time stamp attribute (e.g., the time stamp attribute 402 of FIG. 4) of a library (e.g., the local reference library 222 of FIG. 2), insert a signature value (e.g., one of the signature values SIG1 and SIG3 of FIG. 4) into a signature attribute (e.g., the signature attribute 404), and insert an ID value (e.g., one of the source ID values ID1, ID2, and ID3 of FIG. 4) into a source ID attribute (e.g., the source ID attribute 406 of FIG. 4). The values (e.g., TS1, SIG1, and ID1 of FIG. 4) may be inserted into the respective attributes (e.g., 402, 404, and 406) via a hash table function, a programming statement for XML data insertion, an SQL statement, or any other suitable data insertion mechanism. After inserting the signature information into the library (block 508), the update library process 500 ends and/or returns control to any calling routine(s) (block 510).

Figure 6:
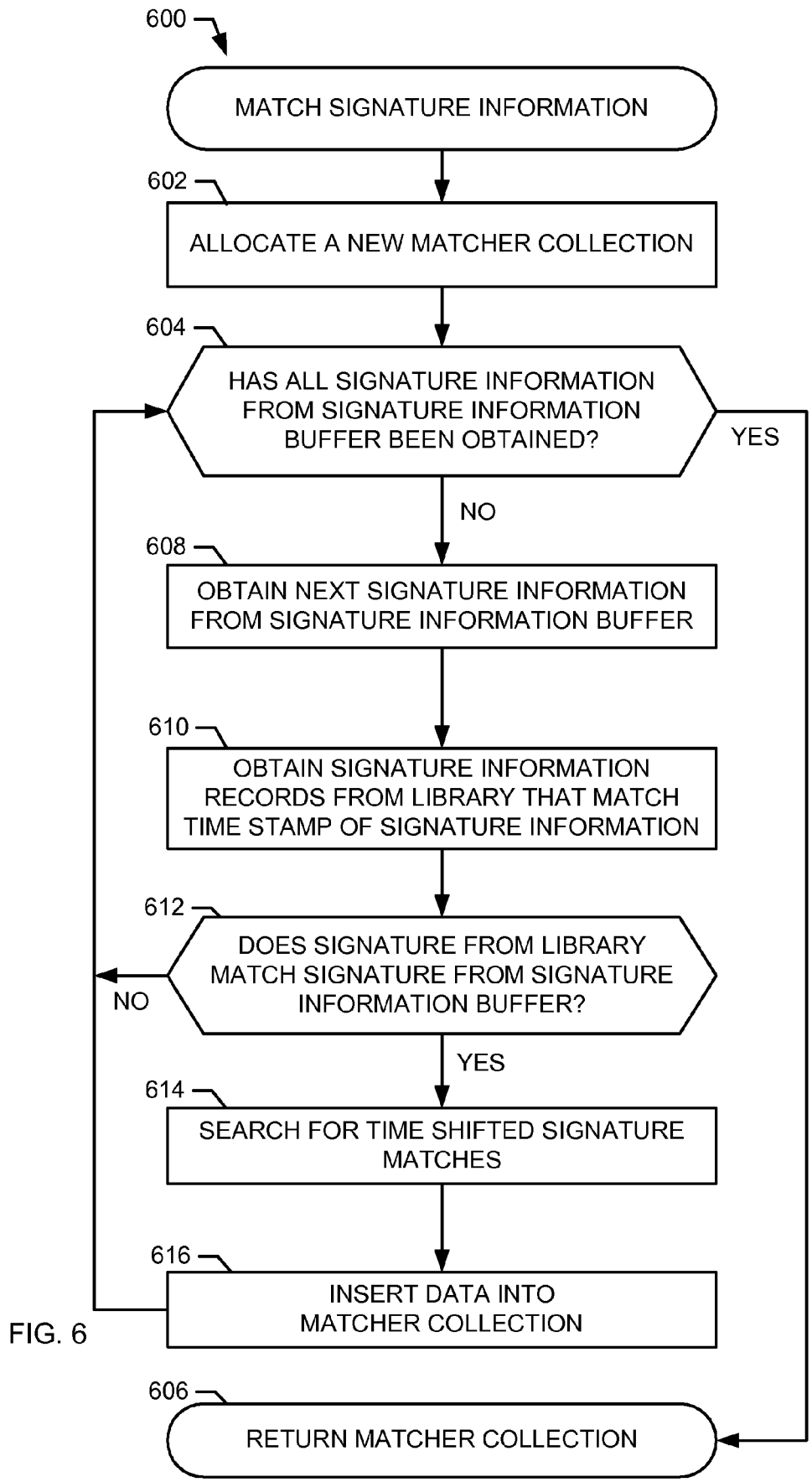
FIG. 6 is a flow diagram of an example process for matching signature information of content subscribers.

FIG. 6 is a flow diagram of an example process for matching signature information (i.e., a match signature information process 600). The match signature information process 600 begins execution by allocating a new matcher collection (block 602). The matcher collection can be statically or dynamically allocated. The matcher collection may be similar to an example matcher collection 700 of FIG. 7. The example matcher collection 700 includes a source ID attribute 702 and a time stamp attribute 704. However, other attributes may be used in addition to those shown in FIG. 7.

Referring to FIG. 6, after allocating a new matcher collection (block 602), the match signature information process 600 determines if all signature information from the signature information buffer 218 of FIG. 2 has been obtained (block 604). The determination of whether all signature information has been obtained may be implemented by, for example, implementing the signature information buffer 218 as a queue data structure of signature information or references to the signature information stored in memory (e.g. the main memory device 1008 of FIG. 10) and iterating through the queue data structure by using a well-known isEmpty function and a well-known remove function that returns the next signature information. If all signature information has been obtained (e.g., the queue data structure is empty) (block 604), the match signature information process 600 ends and/or returns the matcher collection and control to any calling routine(s) (block 606). On the other hand, if all signature information has not been obtained at block 604, the match signature information process 600 may obtain the next signature information from the signature information buffer 218 (FIG. 2) (e.g., by calling the remove function on the queue data structure and saving the return value of the remove function in a variable) (block 608).

After obtaining the next signature information (block 608), the match signature information process 600 obtains signature information (e.g., the signature information 220 of FIG. 2) from a library (e.g., the local reference library 222 of FIG. 2) that matches the signature information retrieved/received from the signature information buffer 218 (block 610). For example, the time stamp attribute of the signature information stored in the library may be matched to the time stamp attribute of the signature information retrieved/received from the signature information buffer 218. If a match is not found (block 610), the match signature information process 600 may be configured to compare the signature information retrieved/received from the buffer 218 to all of the signatures stored in the reference library 222 having an associated time stamp that falls within a desired period of time (e.g., all signatures associated with a time stamp that is within five seconds of the time stamp associated with the signature information retrieved/received from the signature information buffer 218 of FIG. 2).

As can be appreciated from the foregoing, when media content is provided by a media source (e.g., one of the media sources 206, 242, 244, etc. of FIG. 2) to a media delivery device (e.g., the media delivery device 202 of FIG. 2), substantially identical or identical signature information will be generated by a library generator (e.g., one of the library generators 230, 232, and 234) corresponding to the media source and a signature information generator (e.g., the signature generator 208) associated with the media delivery device. As a result, signature information stored within the signature information buffer (e.g., the buffer 218) will substantially or identically match signature information stored in the local reference library (e.g., the library 222) by one or more of the library generators (e.g., generators 230, 232, and/or 234). However, the time stamps associated with those substantially or identically matching signatures may be somewhat different due to differences between the propagation and/or processing delays associated with the different paths via which media content and/or signature information is conveyed. For example, referring to the example system 200 of FIG. 2, if the PVR 242 plays back a program, the library generator 232 generates signature information associated with that program and stores it in the library 222 at first time using a time stamp corresponding to that first time. The media content provided by the PVR 242 is also provided to the media delivery device 202 and the signature information generator 208 generates signature information (which is substantially identical or identical to that generated by the library generator 232) at a second time, which may be prior to or subsequent to the first time due differences in the signal propagation and processing delays between the PVR 242 and the library generator 232 and the PVR 242 and the signature information generator 208.

Referring again to FIG. 6, if a match is found (block 610), the match signature information process 600 determines if the signature from the signature information from the library matches the signature from the signature information from the signature information buffer (block 612). The comparison of signatures may be implemented using any well-known signature comparison technique including, for example, one that uses one or more hash tables to minimize the number of computations required to find a match. For example, a hash table, database, etc. having a time stamp attribute configured as the primary key and a signature attribute configured as the secondary key may be used to enable quick lookup based on a time stamp value and a signature value. Alternatively or additionally, the signature comparison technique may look for a signature match within a range of time (e.g., a ten second range).

If the signatures match (block 612), the match signature information process 600 searches the local reference library 222 of FIG. 2 for time shifted records having a signature that matches the signature from the signature information (block 614). The match signature information process 600 may employ a method that looks at substantially all the signatures but which has been optimized to look at high energy signature first or may use a brute force method to retrieve signature information from the local reference library 222 that matches the signature from the signature information.

After searching the local reference library 222 for time shifted records (block 614), the signature information is added to the matcher collection (block 616). For example, the match signature information process 600 may first insert an ID value (e.g., the value ID1 of FIG. 7) of a matcher collection (e.g., the matcher collection 700 of FIG. 7) into a source ID attribute (e.g., the source ID attribute 702 of FIG. 7) and then insert a time stamp value (e.g., TS1 of FIG. 7) into a time stamp attribute (e.g., the time stamp attribute 704 of FIG. 7). The values (e.g., ID1 and TS1) may be inserted into the attributes (e.g., 702 and 704) via a hash table function, a programming statement for XML data insertion, an SQL statement, or any other suitable insertion mechanism. After inserting data into the matcher collection (block 616), the match signature information process 600 returns control to block 604. If the signatures do not match at block 612, the match signature information process 600 returns control to block 604.

As can be appreciated from the foregoing, because matching signatures are assumed to be representative of the same media content, the collection and analysis of signature information as described herein enables all instances of the delivery of that media content by the various media sources associated with a consumption site to be identified. Further, collecting and analyzing all such matching signatures also enables the identification of the delivery paths of the media content that may be used to develop information about the manner in which that media content was received at a consumption site (e.g., a home), stored for later consumption, and consumed at a later time(s). In an example download, storage and retrieval process, a set of matching signatures (all representing the same media content), each providing various media source information and time stamp information may be used to determine that the media content was delivered on a particular channel at a particular time, then stored on a particular device at a particular time, such as a PVR, and subsequently displayed one or more times at the direction of the user. If the initial delivery of the media content corresponds to a broadcast channel having a known lineup, then the signature information associated with the download may be compared to the lineup to identify the television programming contained in the media content in an efficient manner. The identified programming content can then credited with having been consumed at the times indicated by the signatures captured in connection with the playback of the programming, i.e., the signatures associated with the subsequent display of the media content. In this manner, behaviors and characteristics associated with time-shifted media consumption (e.g., viewing) can be accurately and efficiently captured and analyzed.

Figure 8:
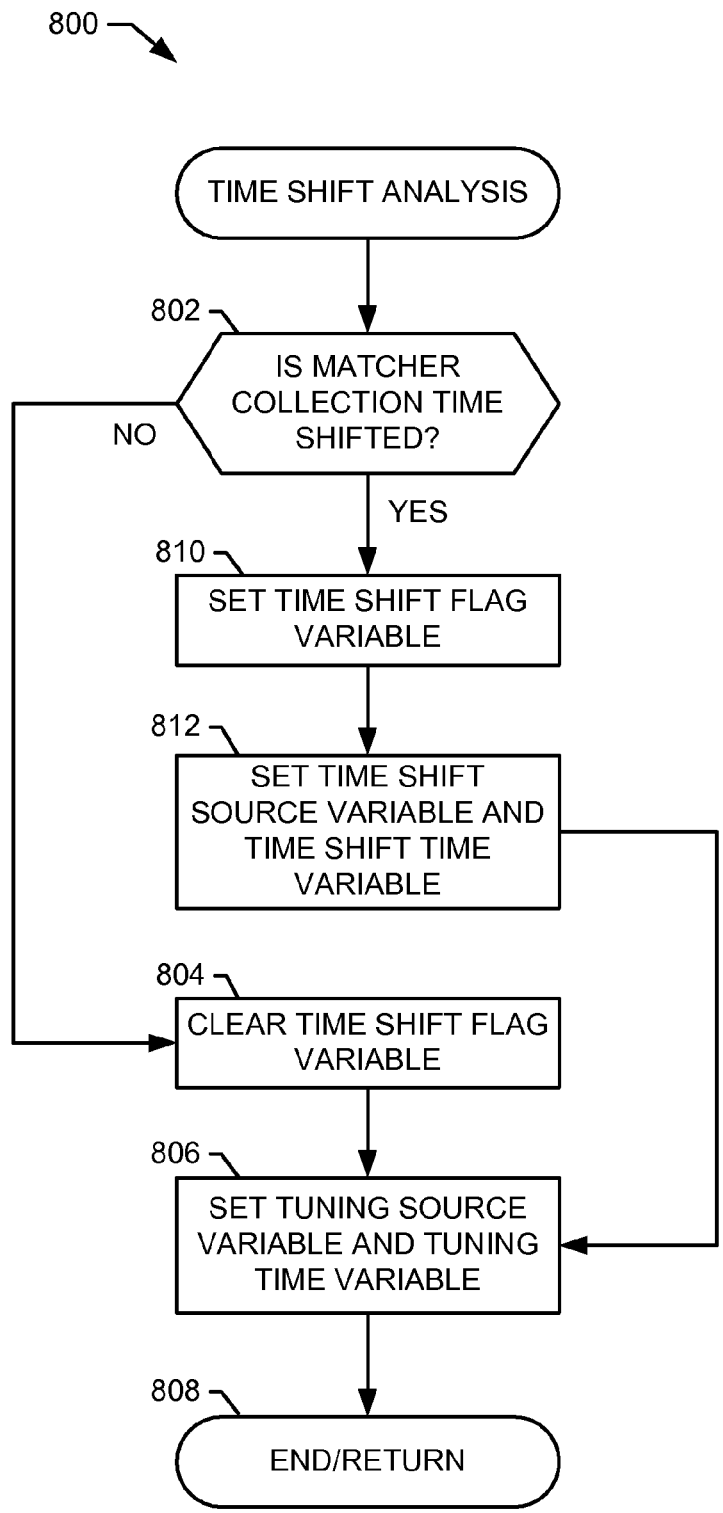
FIG. 8 is a flow diagram of an example process for analyzing time shifted information.

FIG. 8 is a flow diagram of an example process for analyzing time shifted information (i.e., a time shift analysis process 800). The example time shift analysis process 800 begins execution by determining if the matcher collection includes time shifted information (block 802). The techniques used by the time shift analysis process 800 to analyze the matcher collection for time shifted information is discussed above in greater detail in conjunction with block 308 of FIG. 3. If the example time shift analysis process 800 determines that the matcher collection is not time shifted (block 802), the time shift analysis process 800 clears the time shift flag variable in a time shift analysis data structure to indicate that the time shift analysis data structure does not contain time shifted information (block 804). After clearing the time shift flag variable (block 804), the time shift analysis process 800 sets the tuning source variable and the tuning time variable (block 806). The tuning source variable is a source ID value that represents a media source associated with a record that is not time shifted and the tuning time variable is a time stamp value that represents the time at which the media content was displayed or otherwise presented. After setting the tuning source variable and the tuning time variable (block 806), the time shift analysis process 800 ends and/or returns control to any calling routine(s) (block 808).

If the time shift analysis process 800 determines that the matcher collection does include time shifted information (block 802), the time shift analysis process 800 sets the time shift flag variable to indicate that the time shift analysis data structure contains time shifted information (block 810). After setting the time shift flag variable (block 810), the time shift analysis process 800 sets the time shift source variable and the time shift time variable (block 812). After setting the time shift source variable and the time shift time variable (block 812), the time shift analysis process 800 sets the tuning source variable and the tuning time variable (block 806). After setting the tuning source variable and the tuning time variable (block 806), the time shift analysis process 800 ends and/or returns control to any calling routine(s) (block 808).

FIG. 9 is an example time shift analysis data structure 900. The time shift analysis data structure 900 includes a start of structure instruction 902, a TimeShift variable declaration instruction 904, a conditional instruction 906, a TimeShiftSource variable declaration instruction 908, a TimeShiftSourceTime variable declaration instruction 910, an end of conditional instruction 912, a TuningSource variable declaration instruction 914, a TuningTime variable declaration instruction 916, and an end of structure instruction 918. If the conditional instruction 906 is true, which indicates that a time shifted element exists, the TimeShiftSource variable declaration instruction 908 and the TimeShiftSourceTime variable declaration instruction 910 are used by the time shift analyzer 246 (FIG. 2) to store time shifted information.

For example, a time shift analysis data structure containing data that is not time shifted may be represented as shown below.

```
{
TimeShift = false;
TuningSource = ID1;
TuningTime = TS1;
}
```

Alternatively, a time shift analysis data structure containing data that is time shifted may be represented as shown below.

```
{
TimeShift = true;
TimeShiftSource = ID1;
TimeShiftTime = TS1;
TuningSource = ID2;
TuningTime = TS2;
}
```

In the case of the above example data structure containing time shifted information, the variable TuningTime is associated with a tuning time (i.e., a media viewing or presentation time TS2) that is subsequent to the time at which the media content was downloaded, stored, recorded, etc. (i.e., a time TS1 associated with the variable TimeShiftTime). While FIG. 9 is referred to as structure, the code block 900 may be alternatively implemented using a class, a plurality of inline instructions, or any other programming construct.

FIG. 10 is a block diagram of a computer system 1000 that may implement the example apparatus and methods or processes described herein. The computer system 1000 may be a server, a personal computer (PC), a personal digital assistant (PDA), an Internet appliance, a cellular telephone, or any other computing device. In one example, the computer system 1000 includes a main processing unit 1001 powered by a power supply 1002. The main processing unit 1001 may include a processor 1003 communicatively coupled by a system interconnect 1006 to a main memory device 1008 and to one or more interface circuits 1010. In one example, the system interconnect 1006 is an address/data bus. Of course, a person of ordinary skill in the art will readily appreciate that interconnects other than busses may be used to connect the processor 1003 to the main memory device 1008. For example, one or more dedicated lines and/or a crossbar may be used to connect the processor 1003 to the main memory device 1008.

The processor 1003 may include one or more of any type of well-known processor, such as a processor from the Intel® Pentium® family of microprocessors, the Intel® Itanium® family of microprocessors, and/or the Intel® XScale® family of processors. In addition, the processor 1003 may include any type of well-known cache memory, such as static random access memory (SRAM).

The main memory device 1008 may include dynamic random access memory (DRAM) and/or any other form of random access memory. For example, the main memory device 1008 may include double data rate random access memory (DDRAM). The main memory device 1008 may also include non-volatile memory. In one example, the main memory device 1008 stores a software program that is executed by the processor 1003 in a well-known manner. The main memory device 1008 may store one or more compiler programs, one or more software programs, and/or any other suitable program capable of being executed by the processor 1003.

The interface circuits 1010 may be implemented using any type of well-known interface standard, such as an Ethernet interface and/or a Universal Serial Bus (USB) interface. One or more input devices 1012 may be connected to the interface circuits 1010 for entering data and commands into the main processing unit 1001. For example, one or more of the input devices 1012 may be a keyboard, mouse, touch screen, track pad, track ball, isopoint, and/or a voice recognition system.

One or more displays, printers, speakers, and/or other output devices 1014 may also be connected to the main processing unit 1001 via one or more of the interface circuits 1010. The display 1014 may be a cathode ray tube (CRT), a liquid crystal display (LCD), or any other type of display. The display 1014 may generate visual indications of data generated during operation of the main processing unit 1001. The visual indications may include prompts for human operator input, calculated values, detected data, etc.

The computer system 1000 may also include one or more storage devices 1016. For example, the computer system 1000 may include one or more hard drives, a compact disk (CD) drive, a DVD, and/or other computer media input/output (I/O) devices.

The computer system 1000 may also exchange data with other devices via a connection to a network 1018. The network connection may be any type of network connection, such as an Ethernet connection, digital subscriber line (DSL), telephone line, coaxial cable, etc. The network 1018 may be any type of network, such as the Internet, a telephone network, a cable network, and/or a wireless network.

As shown in FIGS. 3, 5, 6, and 8 the processes 300, 500, 600, and 800 may be implemented using one or more software programs or sets of machine readable or accessible instructions that are stored on a machine readable medium (e.g., the main memory device 1008 and/or the storage devices 1016 of FIG. 10) and executed by one or more processors (e.g., the processor 1003 of FIG. 10). However, some or all of the blocks of the processes 300, 500, 600, and 800 may be performed manually and/or by another device. Additionally, although the processes 300, 500, 600, and 800 are described with reference to the flow diagram illustrated in FIGS. 3, 5, 6, and 8, persons of ordinary skill in the art will readily appreciate that many other methods of performing the processes 300, 500, 600, and 800 may be used instead. For example, the order of many of the blocks may be altered, the operation of one or more blocks may be changed, blocks may be combined, and/or blocks may be eliminated.

Although certain apparatus, methods, and articles of manufacture have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of identifying a media source, comprising:
    generating first signature information based on media presented via a media delivery device;
    comparing the first signature information to second signature information, wherein the second signature information is derived from a library of signature information local to the media delivery device;
    generating a collection of matching signature information based on the comparison of the first and second signature information;
    identifying a source of the media presented via the media delivery device based on the collection of matching signature information; and
    performing a time shift analysis on the collection of matching signature information by identifying records in the collection of matching signature information having substantially identical signature values and substantially different time stamp values, wherein the first signature information includes a first time stamp and a first signature value associated with a first media source communicatively coupled to the media delivery device, and wherein the second signature information includes a second time stamp, a second signature value and a source identifier associated with a second media source communicatively coupled to the media delivery device, wherein at least one of generating the first signature information, comparing the first signature information to second signature information, generating the collection of matching signature information, identifying the source of the media, or performing the time shift analysis are performed by a processor executing instructions stored on a computer readable medium.

2. A method as defined in claim 1, wherein comparing the first and second signature information includes comparing signature values and time stamps.

3. A method as defined in claim 1, wherein the first and second media sources are the same media source.

4. A method as defined in claim 1, wherein the first and second media sources include at least one of a personal video recorder, a digital versatile disk player, a digital video recorder, a video cassette recorder, a set-top box, or a game console.

5. A method as defined in claim 1, further comprising updating the library of signature information.

6. A method as defined in claim 1, wherein the library of signature information is at least one of an XML file, a database file, or a file associated with a hash table of second signature information.

7. A method as defined in claim 1, wherein the media presented via the media delivery device includes at least one of a broadcast television program, a broadcast radio program, a game, or a web page.

8. An apparatus as defined in claim 7, wherein the processor is programmed to update the library of signature information.

9. An apparatus as defined in claim 7, wherein the library of signature information is at least one of an XML file, a database file, or a file associated with a hash table of second signature information.

10. An apparatus as defined in claim 7, wherein the media presented via the media delivery device includes at least one of a broadcast television program, a broadcast radio program, a game, or a web page.

11. A method of identifying a media source, comprising:
    generating first signature information based on media presented via a media delivery device;
    comparing the first signature information to second signature information, wherein the second signature information is derived from a library of signature information local to the media delivery device;
    generating a collection of matching signature information based on the comparison of the first and second signature information;

identifying a source of the media presented via the media delivery device based on the collection of matching signature information; and performing a time shift analysis on the collection of matching signature information by identifying records in the collection of matching signature information having substantially identical signature values and substantially different time stamp values, wherein performing the time shift analysis further comprises identifying delayed presentation of the media via the media delivery device, wherein at least one of generating the first signature information, comparing the first signature information to the second signature information, generating the collection of matching signature information, identifying the source of the media, or performing the time shift analysis are performed by a processor executing instructions stored on a computer readable medium.

12. An apparatus for identifying a media source, comprising:

a memory; and a processor coupled to the memory and programmed to:

generate first signature information based on media presented via a media delivery device;

compare the first signature information to second signature information, wherein the second signature information is derived from a library of signature information local to the media delivery device;

generate a collection of matching signature information based on the comparison of the first and second signature information;

identify a source of the media presented via the media delivery device based on the collection of matching signature information; and perform a time shift analysis on the collection of matching signature information by identifying records in the collection of matching signature information having substantially identical signature values and substantially different time stamp values, wherein the first signature information includes a first time stamp and a first signature value associated with a first media source communicatively coupled to the media delivery device, and wherein the second signature information includes a second time stamp, a second signature value and a source identifier associated with a second media source communicatively coupled to the media delivery device.

13. An apparatus as defined in claim 12, wherein the processor is programmed to compare the first and second signature information by comparing signature values and time stamps.

14. An apparatus as defined in claim 12, wherein the first and second media sources are the same media source.

15. An apparatus as defined in claim 12, wherein the first and second media sources include at least one of a personal video recorder, a digital versatile disk player, a digital video recorder, a video cassette recorder, a set-top box, or a game console.

16. An apparatus as defined in claim 12, wherein the processor is programmed to perform the time shift analysis by further identifying delayed presentation of the media via the media delivery device.

17. A machine readable medium having instructions stored thereon that, when executed, cause a machine to:

generate first signature information based on media presented via a media delivery device;

compare the first signature information to second signature information, wherein the second signature information is derived from a library of signature information local to the media delivery device;

generate a collection of matching signature information based on the comparison of the first and second signature information;

identify a source of the media presented via the media delivery device based on the collection of matching signature information; and perform a time shift analysis on the collection of matching signature information by identifying records in the collection of matching signature information having substantially identical signature values and substantially different time stamp values, wherein the first signature information includes a first time stamp and a first signature value associated with a first media source communicatively coupled to the media delivery device, and wherein the second signature information includes a second time stamp, a second signature value and a source identifier associated with a second media source communicatively coupled to the media delivery device.

18. A machine readable medium as defined in claim 17 having instructions stored thereon that, when executed, cause the machine to compare the first and second signature information by comparing signature values and time stamps.

19. A machine readable medium as defined in claim 17, wherein the first and second media sources are the same media source.

20. A machine readable medium as defined in claim 17, wherein the first and second media sources include at least one of a personal video recorder, a digital versatile disk player, a digital video recorder, a video cassette recorder, a set-top box, or a game console.

21. A machine readable medium as defined in claim 17 having instructions stored thereon that, when executed, cause the machine to perform the time shift analysis by further identifying delayed presentation of the media via the media delivery device.

22. A machine readable medium as defined in claim 17 having instructions stored thereon that, when executed, cause the machine to update the library of signature information.

23. A machine readable medium as defined in claim 17, wherein the library of signature information is at least one of an XML file, a database file, or a file associated with a hash table of second signature information.

24. A machine readable medium as defined in claim 17, wherein the media presented via the media delivery device includes at least one of a broadcast television program, a broadcast radio program, a game, or a web page.

25. A method of identifying a media source, comprising:

generating first signature information based on media presented via a media delivery device at a media consumption location;

comparing the first signature information to second signature information, wherein the second signature information is derived from a library of signature information stored at the media consumption location;

generating a collection of matching signature information based on the comparison of the first and second signature information;

identifying a source of the media presented via the media delivery device based on the collection of matching signature information; and performing a time shift analysis on the collection of matching signature information by identifying records in the collection of matching signature information having substantially identical signature values and substantially different time stamp values, wherein the first signature information includes a first time stamp and a first signature value associated with a first media source communicatively coupled to the media delivery device, and wherein the second signature information includes a second time stamp, a second signature value and a source identifier associated with a second media source communicatively coupled to the media delivery device, and wherein at least one of generating the first signature information, comparing the first signature information to second signature information, generating the collection of matching signature information, identifying the source of the media, or performing the time shift analysis are performed by a processor executing instructions stored on a computer readable medium.

26. A method as defined in claim 25, wherein comparing the first and second signature information includes comparing signature values and time stamps.

27. A method as defined in claim 25 wherein the first and second media sources are the same media source.

28. A method as defined in claim 25, wherein the first and second media sources include at least one of a personal video recorder, a digital versatile disk player, a digital video recorder, a video cassette recorder, a set-top box, or a game console.

29. A method as defined in claim 25, wherein performing the time shift analysis further comprises identifying delayed presentation of the media via the media delivery device.

30. A method as defined in claim 25, wherein the library of signature information is generated at the media consumption location.

* * * * *